United States Patent Office 3,251,789
Patented May 17, 1966

3,251,789
TERPOLYMERS OF STYRENE, BUTADIENE AND A PHENOLIC VINYL MONOMER
Elbert C. Ladd, Woodbridge, Conn., assignor to United States Rubber Company, New York, N.Y., a corporation of New Jersey
No Drawing. Filed July 17, 1963, Ser. No. 295,801
16 Claims. (Cl. 260—17.5)

The present invention concerns new synthetic rubbers of the styrene-butadiene copolymer type, and more particularly concerns a new rubbery terpolymer.

For most applications, rubbers must first be cross-linked, i.e., cured or vulcanized. During the curing process, the linear molecules of the rubbery polymers are united by primary chemical bonds to form a 3-dimensional network, so that the resultant product has better physical properties, e.g., higher modulus and greater rebound, than has the raw or non-vulcanized material. Rubbery polymers containing phenolic groups as integral parts of the polymer molecule would possess an advantage over conventional rubbers because rubbers containing integral phenolic groups would be vulcanizable by action of methylene donors (also known as formaldehyde donors) alone, without other curing agents.

Although the polymerization and copolymerization of many combinations of vinyl monomers to produce synthetic rubbers, such as styrene-butadiene rubbers, are well-known to those skilled in the polymerization art, the radically-initiated copolymerization of vinyl monomers containing a phenolic hydroxyl group (henceforth called phenolic vinyl monomers) with butadiene and styrene has heretofore been unknown. Attempts to copolymerize vinylphenols with butadiene meet with failure; for example p-vinylphenol is so unstable that it will homopolymerize on standing at 0° C. and, contrariwise, o-vinylphenol will inhibit dienepolymerization rather than copolymerize with the diene.

It is an object of the present invention to provide a polymer which is rubbery in its physical properties and contains phenolic groups as integral parts of the polymer molecule. It is another object to provide a rubbery heteropolymer of a phenolic vinyl monomer and other olefinic monomers.

Still another object is to provide a rubbery polymer which can be vulcanized by the action of a methylene donor alone. Another object is to provide a rubber which can be chemically bonded to phenolic filler particles, such as lignin, by intercondensation with methylene donor.

A further object of the present invention is to provide a process for vulcanizing (curing) such rubbers.

The instant invention is based on the discovery that certain phenolic vinyl compounds will readily copolymerize with other rubber-forming olefinic monomers to form rubbery terpolymers. Briefly, the polymer of the present invention is a rubbery terpolymer having phenolic hydroxyl groups integrally combined therein comprising the rubbery interpolymerization product of butadiene, styrene and a phenolic vinyl monomer selected from the group consisting of p-hydroxyalpha-phenyl-cinnamonitrile and alpha-benzylidene-p-hydroxyacetophenone.

Briefly, the process of the instant invention comprises curing such a terpolymer by compounding the terpolymer with a methylene donor and heating the resulting mixture to cure it.

The phenolic vinyl monomers suitable for use in the instant invention are compound A: p-hydroxy-alpha-phenylcinnamonitrile (also known as 4-hydroxy-2-phenylcinnamonitrile), and compound B: alpha-benzylidene-p-hydroxyacetophenone (also known as 2-benzylidene-4-hydroxyacetophenone and 4-hydroxy-omega-benzalacetophenone). The formula for compound A is:

(A) 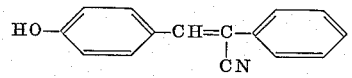

and the formula for compound B is:

(B) 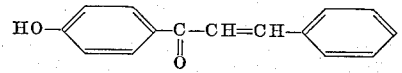

Compound A is the same as that described by Bistrycki et al. in Ber. 34, 3085 (1901) but was purified for use in the instant invention by recrystallization from 95% ethanol (no attempt being made to isolate the pure stereoisomer). Compound B is the same as that described by Kostanecki et al. in Ber. 32, 1924 (1899) and is prepared by condensing 4-hydroxyacetophenone with benzaldehyde.

The other monomers used in preparation of the rubbery terpolymer of the instant invention are styrene and 1,3-butadiene, both of which are commercially available and well-known to those skilled in the art of polymerization. The preferred monomeric content by weight percentage of the terpolymer is from 40 to 85% butadiene, from 10 to 50% styrene, and from 2 to 25% phenolic vinyl compound (5% of the latter being sufficient for most purposes). An especially preferred butadiene/styrene/phenolic vinyl monomer ratio (by weight) is 12:5:1.

The terpolymer of the instant invention is prepared in a radical-initiated emulsion-type polymerization by emulsifying a mixture of the monomers in water by the use of a surface-active agent (such as soap flakes of fatty acid soaps and/or rosin acid soaps) and heating the emulsified mixture in a closed, air-free system in the presence of a free radical source (such as 2,2'-azobis-(2-methylpropionitrile)) and a molecular weight regulator (such as mixed tertiary mercaptans having an average chain length of 12 carbon atoms). Although the particular surface-active agent, free radical source and molecular weight regulator given above are preferred, any of the numerous other compounds typically used for such purposes in the polymerization art may be substituted therefor, such as those disclosed in U.S. Patent 2,395,017. Air may be swept out of the system by vaporization of excess butadiene or by sweeping with any convenient inert gas, such as $N_2$, according to common practice. The phenolic vinyl monomer is conveniently added to the polymerization mixture in the form of a solution with a solvent such as cyclohexanone.

The temperature of the polymerization and the duration of the polymerization are inversely inter-dependent (if identical physical properties are to be obtained), the preferred combination being from 16 to 25 hours at about 50° C.

The rubbery terpolymer may be vulcanized by hexamethylenetetramine, paraformaldehyde or other methylene donors (also known as formaldehyde donors). From 1 to 3 parts of the methylene donor vulcanizing agent, per 100 parts by weight of rubber, and a temperature of at least 150° F. are sufficient for effective vulcanization.

The new terpolymers can also be vulcanized by the usual formulations including sulfur and an accelerator. However, the special advantage of the instant rubbers is that, by virtue of the phenolic groups integrally combined therein, they may be mixed with, say 10–50% by weight of a reinforcing filler of phenolic character, typified by lignin, and vulcanized with a methylene donor, whereby the rubber and the lignin filler become chemically bonded together. The resulting vulcanizates are tough and of high modulus, and, in these properties, resemble rubber vulcanizates containing reinforcing carbon blacks.

EXAMPLE

Terpolymers of the instant invention were prepared by emulsifying an aqueous mixture of styrene, butadiene and one of the phenolic vinyl compounds A and B with a surface-active agent (soap flakes), according to the compositions listed in Table 1. The polymerizations were performed in glass bottles fitted with self-sealing caps, the bottles being mechanically agitated in a water bath set at the desired temperature. The butadiene, in excess of the desired amount, was charged to the bottles last and the excess butadiene allowed to evaporate, thereby providing a convenient means for the removal of air from the bottles. After the polymerization had proceeded to the desired extent (the percentage conversion of the monomers to the terpolymer being determined by an analysis of the percentage of total solids), a 35% aqueous short-stopping solution of $(CH_3)_2CSSNa$ was added to the bottles to stop the polymerization, and the gases in the bottles were then vented. The contents of the bottles were then poured into methanol, and the terpolymer coagulum which formed was washed with methanol. A small amount of a commercial antioxidant (1% by weight of disobutyl-p-cresol) was then mixed into the washed coagulum and the mixture dried at 49° C. None of the rubbery terpolymers thus formed gelled in benzene, and their respective intrinsic viscosities (in benzene) and nitrogen contents were as reported in Table 1.

Terpolymers A and C were then compounded with carbon black and either hexamethylenetetramine or paraformaldehyde on a two-roll mill and finally press-cured at 60 p.s.i.g. and 153° C. for one hour. The tensile and Shore A hardness properties of the hexamethylenetetramine cured stock were tested, respectively, by the American Society for Testing and Materials procedures D–412–61T and D–676–59T, the resulting data being recorded in Table 1. (Similar results are obtained when paraformaldehyde, another methylene donor, is used as the vulcanizing agent. Similar results are likewise obtained when lignin is used in place of some or all of the carbon black, the reinforcing effect of the lignin being intensified by reason of the chemical bonding of the phenolic filler to the phenolic rubber by the formaldehyde donor.)

It should be understood that the precise proportions of materials utilized may be varied, equivalent chemical materials may be employed and reaction conditions modified in accordance with known kinetic and thermodynamic principles, if desired, without departing from the spirit and scope of the invention as defined in the below-appended claims.

Table 1

| Compositions | Parts by Weight | | | |
|---|---|---|---|---|
| | A | B | C | D |
| Water | 180 | 180 | 180 | 180 |
| Soap flakes [1] (surface active agent) | 5 | 5 | 5 | 5 |
| 2,2'-Azobis(2-methylpropionitrile) (free radical source) | 0.2 | 0.3 | 0.2 | 0.3 |
| Mixed tertiary mercaptans [2] (molecular weight regulator) | 0.3 | 0.3 | 0.3 | 0.3 |
| Cyclohexanone (solvent) | 50 | 50 | 50 | 50 |
| p-Hydroxy-alpha-phenylcinnamonitrile | 5 | 5 | | |
| Alpha-Benzylidene-p-hydroxyacetophenone | | | 5 | 5 |
| Styrene | 25 | 25 | 25 | 25 |
| Butadiene | 70 | 70 | 70 | 70 |
| 35% Aqueous short-stop solution [$(CH_3)_2$CSSNa], (ml.) | 2 | 2 | 2 | 2 |
| Polymerization Conditions: | | | | |
| Polymerization temperature, 50° C.— | | | | |
| Time (hours) | 25 | 25 | 16 | 16 |
| Percent total solids | 23.2 | 23.6 | 21.8 | 22.7 |
| Properties After Addition of Antioxidant and Drying at 49° C.: | | | | |
| Intrinsic viscosity in benzene | 2.36 | 1.67 | 2.71 | 1.88 |
| Percent Nitrogen | 0.26 | 0.26 | | |
| Materials Added After Drying: | | | | |
| Carbon Black | 50 | | 50 | |
| Hexamethylenetetramine | 2 | | 3 | |
| Properties After Press-Curing for 60 min. at 60 p.s.i. and 153° C.: | | | | |
| Ultimate Tensile Strength, p.s.i. | 2,400 | | 2,240 | |
| Ultimate Elongation, percent of original | 350 | | 300 | |
| 300% Modulus, p.s.i. | 2,250 | | 1,050 | |
| Shore A Hardness | 70 | | 68 | |

[1] A commercial soap composed of sodium salts of stearic, palmitic and oleic acids.
[2] A mixture of tertiary mercaptans having an average chain length of 12 carbon atoms.

Having thus described my invention, what I claim and desire to protect by Letters Patent is:

1. A terpolymer having phenolic groups integrally combined therein comprising the rubbery polymerization reaction product of butadiene, styrene and a phenolic vinyl monomer selected from the group consisting of p-hydroxy-alpha-phenylcinnamonitrile and alpha-benzylidene-p-hydroxyacetophenone.

2. The terpolymer of claim 1 wherein said terpolymer is from 40 to 85% butadiene, 10 to 50% styrene and 2 to 25% phenolic vinyl monomer by weight.

3. The terpolymer of claim 2 wherein said terpolymer is from 2 to 5% phenolic vinyl monomer by weight.

4. The terpolymer of claim 1 wherein the butadiene/styrene/phenolic vinyl monomer ratio is about 12:5:1.

5. The terpolymer of claim 1 having compounded therewith a methylene donor.

6. The terpolymer of claim 5 wherein said methylene donor is selected from the group consisting of hexamethylenetetramine and paraformaldehyde.

7. The terpolymer of claim 6 having from 1 to 3 parts of methylene donor per 100 parts by weight of terpolymer.

8. The terpolymer of claim 5 having therein a phenolic filler.

9. The terpolymer of claim 8 wherein said phenolic filler is lignin.

10. The terpolymer of claim 9 having from 10 to 50 parts of lignin per 100 parts by weight of terpolymer.

11. The process of curing the terpolymer of claim 1 comprising the steps of (1) compounding said terpolymer with a methylene donor and (2) heating the resulting mixture to cure the terpolymer.

12. The process of claim 11 wherein the methylene donor is selected from the group consisting of hexamethylenetetramine and paraformaldehyde.

13. The process of claim 12 wherein from 1 to 3 parts of methylene donor are compounded in step (1) with 100 parts by weight of said terpolymer.

14. The process of claim 11 wherein a phenolic filler is compounded with said terpolymer in step (1).

15. The process of claim 14 wherein said phenolic filler is lignin.

16. The process of claim 15 wherein from 10 to 50 parts of lignin are compounded in step (1) with 100 parts by weight of said terpolymer.

No references cited.

WILLIAM H. SHORT, *Primary Examiner.*

J. NORRIS, *Assistant Examiner.*